C. M. ANDERSON.
MILKING MACHINE.
APPLICATION FILED OCT. 27, 1913.
1,119,214.
Patented Dec. 1, 1914.
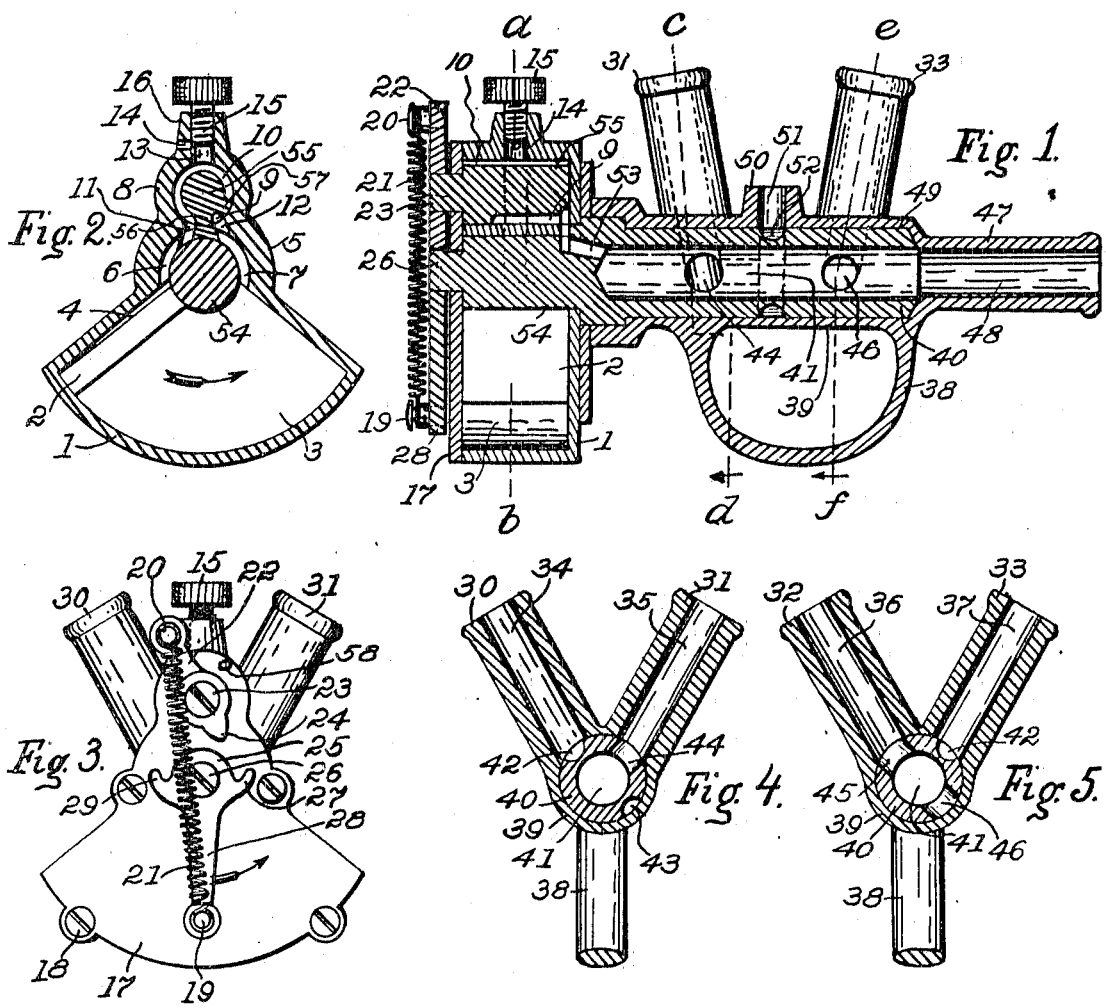

UNITED STATES PATENT OFFICE.

CHARLES M. ANDERSON, OF WATERLOO, IOWA.

MILKING-MACHINE.

1,119,214.   Specification of Letters Patent.   Patented Dec. 1, 1914.

Application filed October 27, 1913. Serial No. 797,521.

*To all whom it may concern:*

Be it known that I, CHARLES M. ANDERSON, a citizen of the United States of America, and a resident of Waterloo, Blackhawk county, Iowa, have invented certain new and useful Improvements in Milking-Machines, of which the following is a specification.

My invention relates to improvements in milking-machines, and the object of my improvements is to furnish a vacuum-operated motor for such a machine of the pulsating type, wherein intermediate mechanism is used and operated by said motor to alternately cut off and then restore a vacuum within the teat-cups. This object I have accomplished by the mechanism which is hereinafter described and claimed, and which is illustrated in the accompanying drawings, in which:

Figure 1 is a longitudinal axial section of my improved mechanism, including the motor and regulating valves, but excluding the teat-cups and their connections as well as the connections to the air-pump. Fig. 2 is a vertical transverse section of the motor of said machine taken on the line a—b of Fig. 1. Fig. 3 is an end elevation of the motor casing and of the tripping-device mounted thereon. Fig. 4 is a vertical transverse section of said machine, taken on the line c—d of Fig. 1. Fig. 5 is a vertical transverse section of said machine, taken on the line e—f of said Fig. 1.

Similar numerals of reference denote corresponding parts throughout the several views.

The valve-chamber comprises a cylindrical hollow part 39 having a diminished alined integral hollow part 47, the interior hollow 48 of the latter communicating with the interior hollow or cylindrical bore 49 of the former, and the expanded left-hand end of the part 39 is secured to the motor-casing 1, the latter covered by a face-plate 17, secured removably thereto by means of screws 18.

The part 39 has an integral handle 38. The diminished part 47 is adapted for connection to a tube which in turn may be received into communication with a milk receptacle which latter (not shown) is closed in the usual manner so as to be exhausted of air by means such as an air-pump also not shown. The part 39 has four divergent integral tubes, 30, 31, 32 and 33, all of which are in communication with its interior hollow 49, and a similar number of teat-cups (not shown) may be placed in communication therewith.

A cylindrical valve-body 40 is seated in the hollow 49 of the part 39 and has its axial hollow 41 in communication with the hollow 48 of the diminished part 47, while the opposite end of the hollow 41 is in communication by way of a diminished channel 53 with the port 9 in the casing 8. The part 39 also has an integral boss 50 whose hollow 51 is in communication with the hollow 49. The valve-body 40 has an exterior annular groove 52 which is in communication with the bore 51 of said boss 50. The numerals 44, 45 and 46 denote orifices in the walls of said valve-body effecting communication occasionally between its interior hollow 41 and the passages of the tubes 30, 31, 32 and 33. Longitudinal grooves 42 and 43 in said valve-body effect communication between the annular groove 52 and said orifices.

The motor-chamber 1 contains a rock-body 26—54, and the inner part 54 thereof has an integral radially-projecting piston 2 fitted to the interior of the chamber to rock therein. The side-walls of said chamber are so inclined as to leave a small space 4 at either side of said piston when the latter is rocked toward that side to its limit of movement in that direction. The part 8 is a valve-casing whose interior hollow 10 contains a rock-valve 23—55 partially spaced from its interior walls, the inner part 55 having two radial integral parts spaced apart to form the port 9 and whose outer ends fit the interior walls of the chamber movably. The casing 8 has an exterior integral boss 16, whose hollow 13 receives an adjusting-screw 15 adapted to more or less restrict the opening of an air-port 14 extending transversely through the wall of the boss into communication with its hollow 13, and the hollow 13 communicates with the port 10 of the valve-chamber 8.

The numerals 6 and 7 denote channels passing over opposite sides of the rock-body 54, to effect communication alternately with the port 10, and the intermediate port 9 between the projections 56 and 57 of the rock-body 55 by way of the channels 11 and 12. The orifice 14 suffices as an air-inlet port for the chamber in the part 8 which partly surrounds the rock-body 55 in the casing 1, and by way of said channels alternately to the spaces 3 and 4 of said casing 1, as regulated by the movements of the rock-body 55.

Referring to Fig. 3, the outwardly-projecting end 23 of the rock-body 55 has a ring secured thereon having an integral arm 22 and an oppositely-directed integral detent 24. Another ring is secured on the outwardly-projecting part 26 of the rock-body 54 and has an integral arm 28 and two like catches 27 and 29. Stops 58 of which only one is shown are located on either side of the arm 22, projecting from the face-plate 17, to limit the throw of said arm to either side. The ends of the arms 22 and 28 have fixed studs 20 and 19 respectively, and a coiled tension spring 21 is connected between said studs as shown.

Operation: Presuming that the diminished part 47 of the valve-chamber 39 is properly connected up to a milk-receptacle, which latter is in turn exhausted of air by means of a communicating air-pump which induces a like exhaustion of air from the hollow 48 of said part and the hollow 41 of the valve 40, it will be seen that by way of the channels 53, and 9, and one or the other of the channels 11—6 or 12—7, the air is exhausted from the communicating hollow 4 or 3 of the chamber-casing 1. In the said figure, the parts are shown in positions where the piston 2 is at one limit of its stroke and ready to return. In this case the air is exhausted from the chamber 3, and since the chamber 4 is now in communication with the air-inlet 14, the air-pressure rocks the piston 2 to the right to its limit of movement in that direction. As the piston rocks to the right, the fixed arm 28 on the outside of the casing 1 likewise rocks to the right until in its progress its catch 27 engages the detent 24 and causes a rocking of the valve-body 55 in an opposite direction. The spring 21 is placed under increasing tension as the arm 28 moves to the right until the said arm is in line therewith. The further movement of said arm causes a releasing of the tension of the spring, or in other words, trips it, and the spring, recoiling, causes both the rock-bodies 54 and 55 to be rotated effectively and quickly to their limits of movement, at the time when the air-exhaustion in the chamber 3 is most attenuated and least effective in its moving action or suction on the piston 2. The chamber 4 is thus brought into communication with the air-exhausting means and shut off from said air-inlet, when the same cycle of operation takes place in an opposite direction. The opposite rockings of the valve 40, which is integral with and rocked by said piston-carrying body 54, causes the ports in said valve to be alternately moved past the passages 34, 36, 35 and 37 of the tubes 30, 32, 31 and 33, respectively, which respectively communicate with the teat-cups (not shown). I have described the specific motor mechanism herein, but do not desire to be confined to the use of this motor, since any other suitable motor may be employed which is convenient for the purpose. The longitudinal grooves 42 and 43 also effect alternate communication between the said passages and the air-inlet 51 by way of the annular groove 52, at such times that while certain of said passages are in direct communication with the air-exhausting means, the other passages are in communication with said air-inlet, whereby a pulsating effect is obtained upon the teats of the animal, due to the variation of degree of air-exhaustion, thereby obtained in the teat-cups from no suction to the maximum, thus simulating the natural suction exercised by a calf in the act of sucking. Since such a natural effect is obtained, the animal does not hold back her milk, and thus a rapid milking is secured. The device is so small and compact as to not be a burden to the animal, and is convenient to handle and transport or clean.

Having described my invention, what I claim as new, and desire to secure by Letters Patent, is:

1. In a milking-machine, a valve-chamber containing air-inlet- and outlet-ports, and having passages adapted to be placed in communication with a plurality of teat-cups respectively, said air-outlet port being adapted to be placed in communication with air-exhausting-means by way of an inclosed air-exhausted milk-receptacle, a rock-valve in said valve-chamber having an interior hollow in communication with said air-outlet port and having channels for occasional communication between its hollow and said passages leading to the teat-cups and also having other channels adapted for occasional communication between said passages and said air-inlet as the valve is rocked to and fro, and while the passages are not in communication with the interior hollow of the valve, and means for rocking said valve to and fro a limited distance to effect the said occasional communications alternately.

2. In a milking-machine, a valve-chamber having both inlet- and outlet-ports, a rock-valve in said chamber having different channels therein adapted for alternate occasional communication with said ports when the valve is rocked to and fro, a motor-casing whose interior hollow is divided by a rock-piston integral with said rock-valve, the latter extending into said casing, and projecting therethrough exteriorly, a second valve-chamber containing a rock-valve and in communication with both sides of said motor-casing and also being in communication with the channel of said first-mentioned rock-valve which communicates with the air-outlet port of the first-mentioned valve-chamber, said second-mentioned valve-chamber having an air-inlet and said valve being adapted to alternately cut off the communication between one side and the other of said motor-casing and said inlet for air while opening communication between the same side of the motor-casing and the passage in the first-mentioned valve leading to the said air-outlet when the valve is rocked to and fro, the second-mentioned valve extending through its chamber exteriorly, and coacting operating means secured to the exterior parts of said valves adapted to cause limited rocking movements of the second-mentioned valve to and fro when the first-mentioned valve is rocked to and fro by reason of the establishing of an exhaustion of the air in one side of the casing.

3. In a milking-machine, a valve-chamber having both inlet- and outlet-ports, a rock-valve in said chamber having different channels therein adapted for alternate occasional communication with said ports when the valve is rocked to and fro, a motor-casing whose interior hollow is divided by a rock-piston integral with said rock-valve, the latter extending through said casing to project exteriorly therefrom, a second valve-chamber containing a rock-valve and in communication with both sides of said motor-casing and also being in communication with the channel of said first-mentioned rock-valve which communicates with the air-outlet port of the first-mentioned valve-chamber, said second-mentioned valve-chamber having an air-inlet and said valve being adapted to alternately cut off the communication between one side and the other of said motor-casing and said air-inlet while opening communication between the same side of the motor-casing and the passage in the first-mentioned valve leading to the said air-outlet when the valve is rocked to and fro, the second-mentioned valve extending outwardly of its chamber and having a radial arm and also a detent placed opposite to said radial arm, the part of the first-mentioned valve which extends outside of the motor-casing also having a radial arm extending oppositely to the arm on the other valve, and having like fixed catches on opposite sides, each catch, when the valve is rocked in one direction being adapted to engage and trip said detent to rock the second-mentioned valve in an opposite direction, and a coiled tension-spring connected between the extremities of the arms on said valves and adapted to be placed under increasing tension when the piston is moving in the first part of its forward stroke, and to pass beyond its dead-center and recoil during the remainder of the stroke to effectively act upon the second-mentioned valve to push it to the final limit of its stroke.

Signed at Waterloo, Iowa, this 13th day of Oct. 1913.

CHARLES M. ANDERSON.

Witnesses:
  GEO. C. KENNEDY,
  PEARL STANTON.